(12) United States Patent
Shibayama et al.

(10) Patent No.: US 11,520,382 B2
(45) Date of Patent: Dec. 6, 2022

(54) PORTABLE INFORMATION DEVICE

(71) Applicant: Lenovo (Singapore) Pte. Ltd., Singapore (SG)

(72) Inventors: Yoshiyuki Shibayama, Kanagawa (JP); Seita Horikoshi, Kanagawa (JP); Yuta Tsuganezawa, Kanagawa (JP); Tatsuya Ushioda, Kanagawa (JP); Hiroaki Kinoshita, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/240,306

(22) Filed: Apr. 26, 2021

(65) Prior Publication Data

US 2021/0365076 A1 Nov. 25, 2021

(30) Foreign Application Priority Data

May 20, 2020 (JP) .............................. JP2020-088105

(51) Int. Cl.
*G06F 1/16* (2006.01)
(52) U.S. Cl.
CPC .......... *G06F 1/1681* (2013.01); *G06F 1/1652* (2013.01)
(58) Field of Classification Search
CPC .... G06F 1/1681; G06F 1/1652; G06F 1/1616; H04M 1/022; H04M 1/0268
See application file for complete search history.

(56) References Cited

U.S. PATENT DOCUMENTS

| 10,485,116 | B2 * | 11/2019 | Kim ...................... H05K 5/0017 |
| 10,564,682 | B1 * | 2/2020 | Wu ....................... H05K 5/0226 |
| 10,834,814 | B2 * | 11/2020 | Cho ...................... H05K 5/0226 |
| 10,908,639 | B2 * | 2/2021 | Shibayama ........... G06F 1/1658 |
| 10,912,214 | B2 * | 2/2021 | Kang ...................... H05K 5/03 |
| 11,076,499 | B2 * | 7/2021 | Jeon ..................... H05K 5/0017 |
| 11,237,596 | B2 * | 2/2022 | Kim ...................... G09F 9/301 |

(Continued)

FOREIGN PATENT DOCUMENTS

| EP | 1785805 A2 | 5/2007 |
| JP | 2018-112835 A | 7/2018 |

OTHER PUBLICATIONS

Office Action issued in corresponding Japanese Patent Application No. 2020-088105, dated Jun. 29, 2021 (4 pages).

(Continued)

*Primary Examiner* — Rockshana D Chowdhury
(74) *Attorney, Agent, or Firm* — Osha Bergman Watanabe & Burton LLP

(57) ABSTRACT

A portable information device includes a display extending over a first chassis and a second chassis, and a bezel disposed straddling over an outer edge of the display and a chassis frame, adjacent to the outer edge, of the first chassis and the second chassis and having a bending part. The bending part includes a first member and a second member. The first member includes first and second side portions. The first side portion is fixed to a front face of the outer edge and the second side portion is disposed to be relatively movable with respect to the chassis frame, in a width direction straddling over the outer edge and the chassis frame of the first chassis and the second chassis. The second member is fixed to a front face of the first member and made of a material more flexible than that of the first member.

8 Claims, 11 Drawing Sheets

(56) References Cited

U.S. PATENT DOCUMENTS

| | | |
|---|---|---|
| 11,240,920 B2 * | 2/2022 | Jeon .................... H05K 5/0217 |
| 11,314,283 B2 * | 4/2022 | Yeh ...................... G06F 1/1652 |
| 2016/0262273 A1 | 9/2016 | Fujita et al. |
| 2017/0061836 A1 | 3/2017 | Kim et al. |
| 2017/0194580 A1 | 7/2017 | Lee |
| 2017/0365197 A1 | 12/2017 | Kim et al. |
| 2017/0374749 A1 | 12/2017 | Lee et al. |
| 2018/0196468 A1 | 7/2018 | Watamura et al. |
| 2020/0103941 A1 * | 4/2020 | Lin ...................... G06F 1/1641 |

OTHER PUBLICATIONS

Extended European Search Report issued in corresponding European Patent Application No. 21164569.2 dated Nov. 25, 2021 (9 pages).

* cited by examiner

PORTABLE INFORMATION DEVICE

TECHNICAL FIELD

The present invention relates to a portable information device in which right and left chassis are rotatably connected.

BACKGROUND

In recent years, portable information devices, such as a tablet PC and a smartphone having a touch panel type liquid crystal display and not having a physical keyboard, have rapidly spread. The display of this kind of portable information device has been desired to be large in use but has been desired to be miniaturized in carrying.

Then, the present applicant has proposed a portable information device in which not only a chassis but also a display is configured to be foldable by the use of a flexible display, such as organic EL (Electro Luminescence) (for example, refer to Japanese Unexamined Patent Application Publication No. 2018-112835).

In a configuration of the above-described Japanese Unexamined Patent Application Publication No. 2018-112835, by mounting a bezel member at an outer peripheral edge portion of a front face of a display, an outer peripheral edge portion of a display is supported and the quality of appearance is improved. Such a bezel member must be smoothly bent together with the display, and thus has a part having flexibility. However, there are concerns that due to turning radius difference from a rotational center of a hinge connecting chassis, a wrinkle or recess may occur in such a flexible bending part at some rotational angles and the quality of appearance is reduced. In addition, when a compressing force caused by the turning radius difference is applied to the bending part of the bezel member, there are concerns that this compressing force may cause peeling-off when it escapes as a force in a peeling-off direction against an adhesive part between the bezel member and the display or chassis.

SUMMARY

One or more embodiments provide a portable information device capable of suppressing the reduction in quality of appearance in the bezel member and peeling-off of the bezel member.

A portable information device according to one or more embodiments is a portable information device, including a first chassis, a second chassis adjacent to the first chassis, a hinge configured to relatively rotatably connect adjacent end portions of the first chassis and the second chassis, a display extending over the first chassis and the second chassis and having a bending region at a position straddling the adjacent end portions, and a bezel member provided straddling over an outer peripheral edge portion of the display and a chassis frame part, adjacent to the outer peripheral edge portion, of the first chassis and the second chassis and having a bending part at a portion overlapping the bending region, in which the bending part of the bezel member has a first member having a first side portion and a second side portion, the first side portion being fixed to a front face of the outer peripheral edge portion and the second side portion being disposed to be relatively movable with respect to the chassis frame part, in a width direction straddling over the outer peripheral edge portion of the display and the chassis frame part of the first chassis and the second chassis, and a second member laminated on and fixed to a front face of the first member and made of a material more flexible than that of the first member, the first member has a configuration in which a plurality of strip members extending in the width direction is arranged in an arranging direction of the first chassis and the second chassis, by a plurality of slits penetrating in the width direction being provided side by side in the arranging direction.

The bezel member may be configured to connect a first frame part to be disposed at the first chassis and a second frame part to be disposed at the second chassis by the bending part, the first frame part and the second frame part may each have a third member having a first side portion and a second side portion, the first side portion being fixed to the front face of the outer peripheral edge portion and the second side portion being relatively connected with respect to the chassis frame part, in the width direction, and a fourth member laminated on and fixed to a front face of the third member and made of a material more flexible than that of the third member.

A thickness of the first frame part and the second frame part of the bezel member may be greater than that of the bending part.

In the bezel member, the second member and the fourth member may be continuous, and the first member and the third member may be divided by a wall part made of the same material as that of the second member.

The hinge may be disposed between the outer peripheral edge portion and the chassis frame part, and the first member may have a central portion between the first side portion and the second side portion, the central portion being disposed on a top portion of the hinge in a state of being relatively movable.

The strip member may have a dimension in the arranging direction greater than that of the slit.

The first member may be made of resin, and the second member may be made of rubber.

A portable information device according to one or more embodiments includes a first chassis, a second chassis adjacent to the first chassis, a hinge configured to relatively rotatably connect adjacent end portions of the first chassis and the second chassis, a display extending over the first chassis and the second chassis and provided with a bending region at a position straddling the adjacent end portions, and a bezel member provided straddling over an outer peripheral edge portion of the display and a chassis frame part, adjacent to the outer peripheral edge portion, of the first chassis and the second chassis and having a bending part at a portion overlapping the bending region, in which a thickness of the bending part of the bezel member is less than that of a part other than the bending part.

The bending part of the bezel member may have a first member having a first side portion and a second side portion, the first side portion being fixed to a front face of the outer peripheral edge portion and the second side portion being disposed to be relatively movable with respect to the chassis frame part, in a width direction straddling over the outer peripheral edge portion of the display and the chassis frame part of the first chassis and the second chassis, and a second member laminated on and fixed to a front face of the first member and made of a material more flexible than that of the first member, and the first member may have a wave-shaped part in which a plurality of strip members extending in the width direction is arranged in an arranging direction of the first chassis and the second chassis, by a plurality of slits penetrating in the width direction being provided side by side in the arranging direction.

According to one or more embodiments, it is possible to suppress the reduction in quality of appearance in the bezel member and peeling-off of the bezel member.

DETAILED DESCRIPTION

Hereinafter, portable information devices according to one or more embodiments will be described in detail with reference to the attached drawings.

Figure 1:
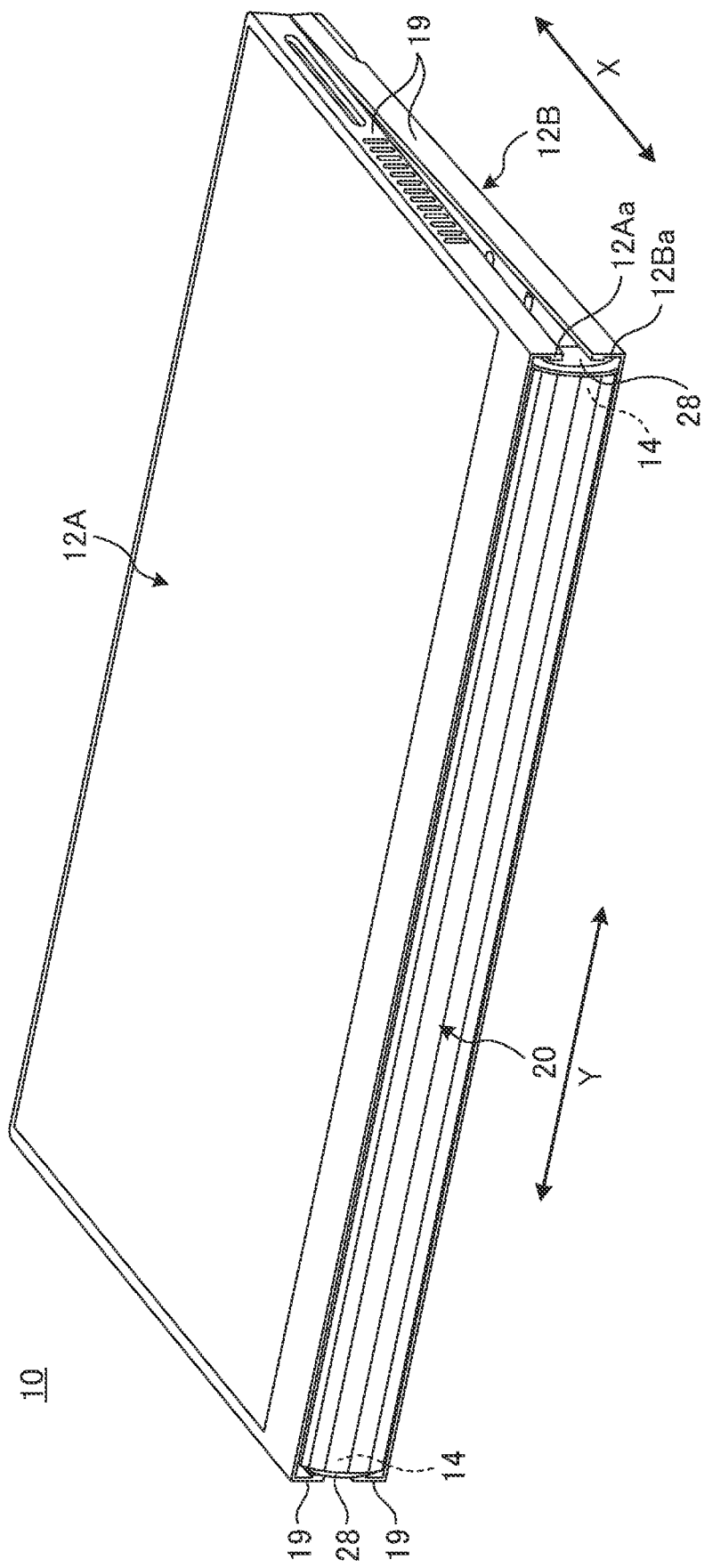
FIG. 1 is a perspective view in a state in which a portable information device according to one or more embodiments is closed into a folded form.
Figure 2:
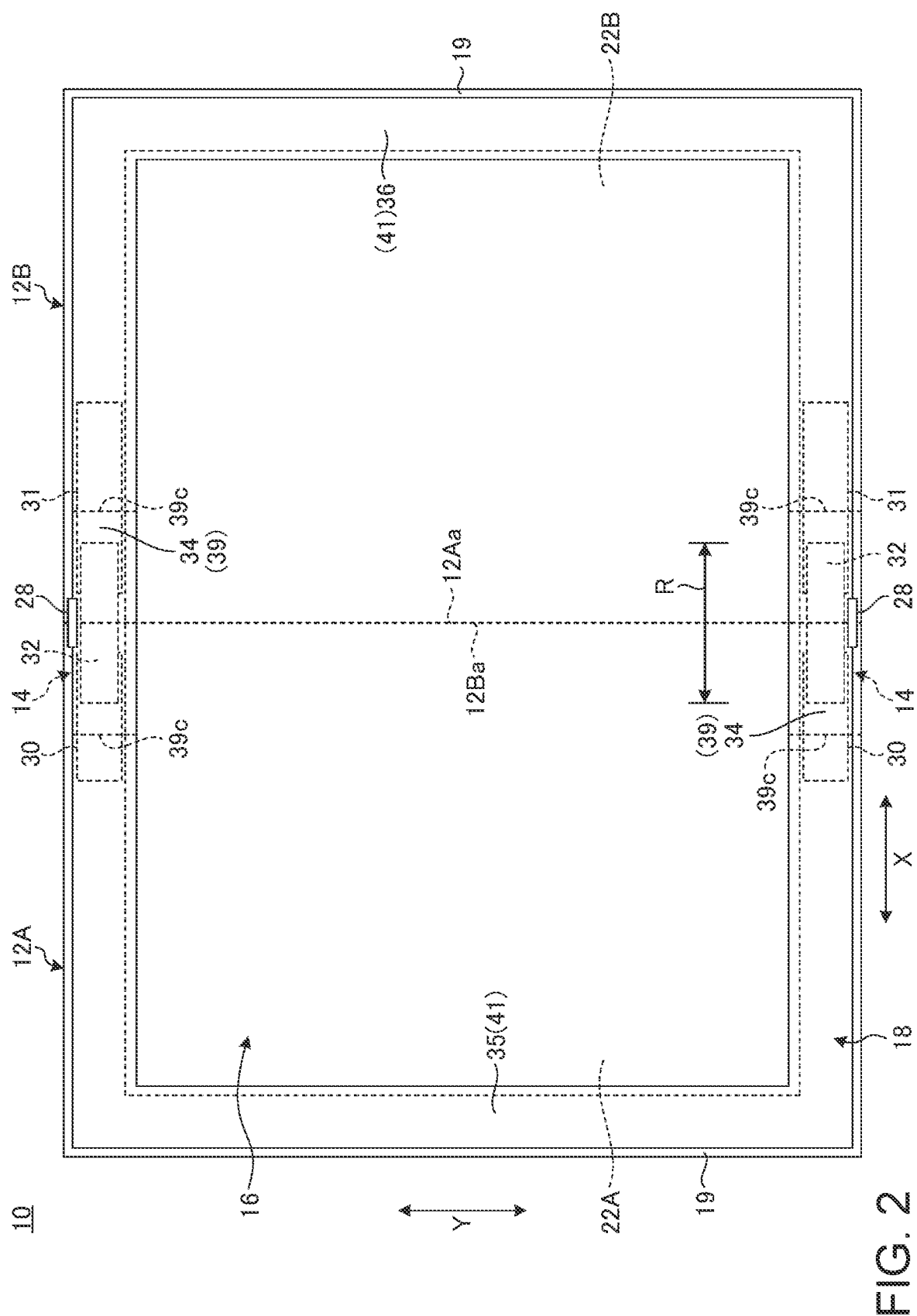
FIG. 2 is a schematic plan view in a state in which the portable information device as illustrated in FIG. 1 is opened into a flat plate form.
Figure 3:
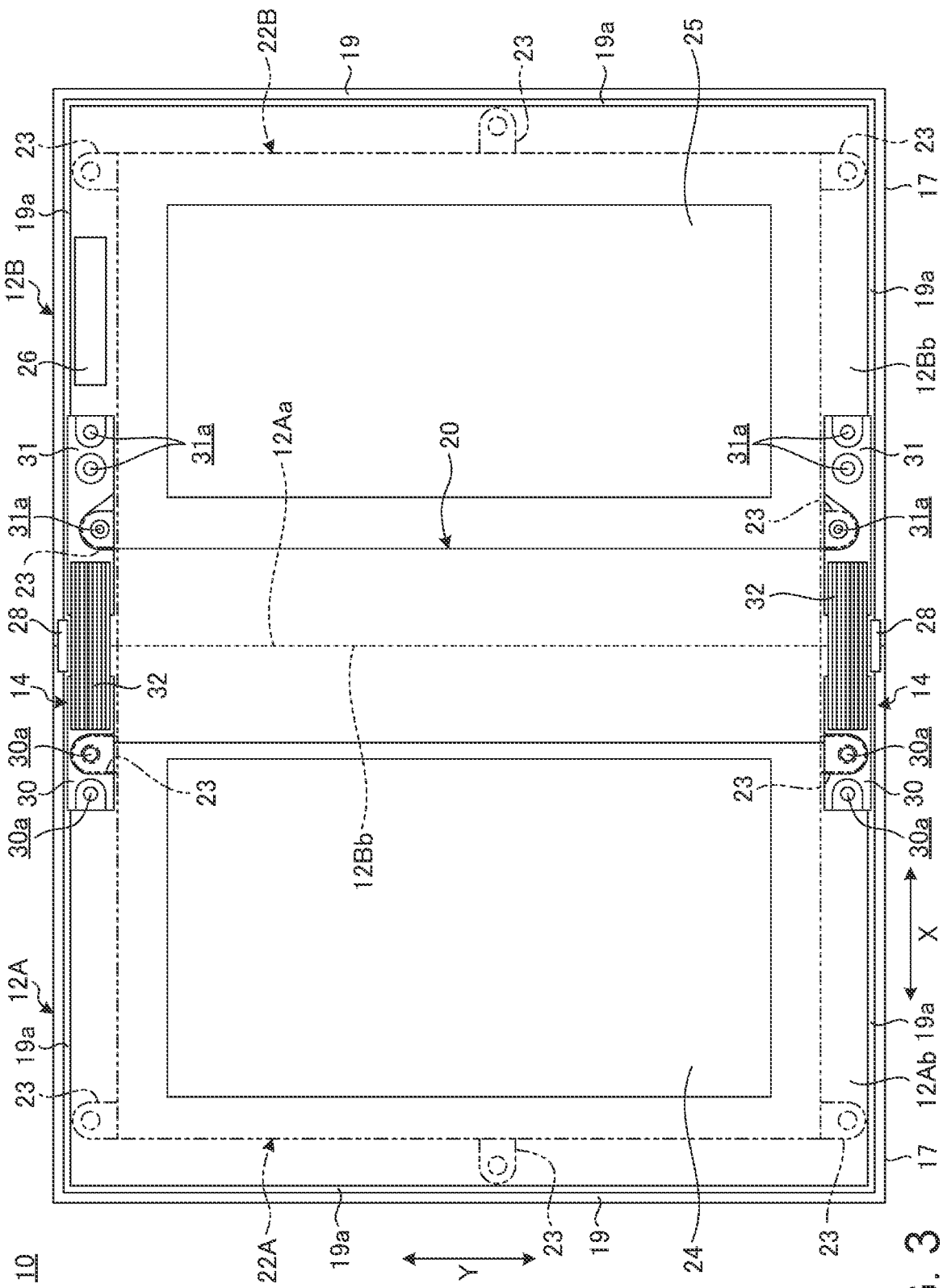
FIG. 3 is a plan view schematically illustrating an internal structure of the portable information device as illustrated in FIG. 2.

FIG. 1 is a perspective view in a state in which a portable information device 10 according to one or more embodiments is closed into a folded form. FIG. 2 is a schematic plan view in a state in which the portable information device 10 as illustrated in FIG. 1 is opened into a flat plate form. FIG. 3 is a plan view schematically illustrating an internal structure of the portable information device 10 as illustrated in FIG. 2.

As illustrated in FIG. 1 to FIG. 3, the portable information device 10 includes a first chassis 12A, a second chassis 12B, a hinge 14, a display 16, and a bezel member 18. The portable information device 10 according to one or more embodiments is a tablet PC that is foldable into a double-folded state like a book. The portable information device 10 may be a cellular phone, a smartphone, an electronic notebook, or a portable game console, etc.

The chassis 12A and 12B are each disposed adjacent to each other. The chassis 12A and 12B are each formed of a rectangular plate-like member on three sides of which other than a side (adjacent end portion 12Aa or 12Ba) facing to each other a chassis frame part 19 is formed upright. The chassis 12A and 12B are each composed of, for example, a metallic plate such as stainless steel, magnesium, or aluminum, or a fiber reinforced resin plate containing reinforced fiber, such as carbon fiber.

Hereinafter, as illustrated in FIG. 1 to FIG. 3, a direction in which the chassis 12A and 12B of the portable information device 10 are arranged is referred to as an X direction and a direction along the adjacent end portions 12Aa and 12Ba orthogonal to the X direction is referred to as a Y direction.

The adjacent end portions 12Aa and 12Ba of the chassis 12A and 12B are connected through a pair of the hinges 14. The chassis 12A and 12B are relatively rotatable between the folded form as illustrated in FIG. 1 and the flat plate form as illustrated in FIG. 2 by the hinges 14. The hinges 14 are, for example, each disposed at both end portions in the Y direction, of the adjacent end portions 12Aa and 12Ba of the chassis 12A and 12B, and are located outside of an outer peripheral edge portion 16b of the display 16. In the portable information device 10 according to one or more embodiments, the center of rotation between the chassis 12A and 12B is coincident with a front face 16a of the display 16.

The adjacent end portions 12Aa and 12Ba of the chassis 12A and 12B abut each other when in the flat plate form (refer to FIG. 2). The adjacent end portions 12Aa and 12Ba of the chassis 12A and 12B are separated to form a large gap, when in the folded form (refer to FIG. 1). This gap is covered by a backbone member 20 on the inner faces 12Ab and 12Bb straddling the adjacent end portions 12Aa and 12Ba (refer to FIG. 1 and FIG. 3).

As illustrated in FIG. 2, the display 16 extends over the chassis 12A and 12B. The display 16 is, for example, a touch panel type liquid crystal display. The display 16 is a flexible display, such as an organic EL having a paper structure with high flexibility. The display 16 seamlessly covers display surfaces (top openings) of the chassis 12A and 12B and is opened/closed with an opening/closing operation of the chassis 12A and 12B. As illustrated in FIG. 3, the display 16 is supported by a first plate 22A and a second plate 22B and extends over the plates 22A and 22B.

The first plate 22A is disposed to cover the top opening of the first chassis 12A. The second plate 22B is disposed to cover the top opening of the second chassis 12B. The plates 22A and 22B are disposed adjacent to each other and support the display 16 on their front faces. A back face of the display 16 is stuck to the front faces of the plates 22A and 22B using an adhesive such as a double-sided tape. The plates 22A and 22B are thin and hard plate-like members, and are formed of, for example, a fiber reinforced resin plate including carbon fiber, or a metallic plate made of stainless steel etc.

The plates 22A and 22B each have a plurality of attachment pieces 23 that is projectingly provided on three outer peripheral end faces except for an end face adjacent to each other. Each attachment piece 23 is screwed to, for example, a boss section (not illustrated) that is raised from the inner faces 12Ab and 12Bb of the chassis 12A and 12B. Some attachment pieces 23 are relatively fixed to the chassis 12A and 12B by being screwed to the hinge 14. The display 16 is relatively fixed to the chassis 12A and 12B through the plates 22A and 22B. Thus, the plates 22A and 22B are rotated integrally with the chassis 12A and 12B, and the display 16 is opened/closed accordingly. The plates 22A and 22B may be fixed, for example, by directly screwing their back faces to the boss section etc., in place of some or all of the attachment pieces 23.

As illustrated in FIG. 2, the display 16 has a bending region R in a range straddling the adjacent end portions 12Aa and 12Ba. The bending region R is a belt-like region that is short in the X direction and long in the Y direction. The bending region R is a part that is bent when the chassis 12A and 12B are changed from the flat plate form to the folded form. The display 16 may have a structure in which only the bending region R is flexible. The bending region R is not fixed to the plates 22A and 22B and is relatively movable with respect to the front faces of the plates 22A and 22B (refer to FIG. 5).

As illustrated in FIG. 2, the bezel member 18 is provided straddling over the outer peripheral edge portion 16b of the display 16 and the chassis frame part 19 of the chassis 12A and 12B. Although in one or more embodiments, the bezel member 18 straddles over the display 16 and the chassis frame part 19 that is an external wall of the chassis 12A and 12B, this chassis frame part 19 does not have to be the external wall of the chassis 12A and 12B and may be composed of, for example, a frame-like member that is separately disposed on an inside face or outside face of the external wall. The bezel member 18 covers a non-display region (non-active region) on an outer periphery of a display region (active region) of the front face 16a of the display 16. A detailed configuration of the bezel member 18 will be mentioned later.

As illustrated in FIG. 3, the chassis 12A and 12B contain, for example, a motherboard 24 mounted with various types of semiconductor chips, a battery device 25, an antenna device 26, as well as various types of electronic components, and a cooling device etc. These electronic components etc. are contained in a space formed between the inner faces 12Ab and 12Bb of the chassis 12A and 12B and the back faces of the plates 22A and 22B.

Figure 4:
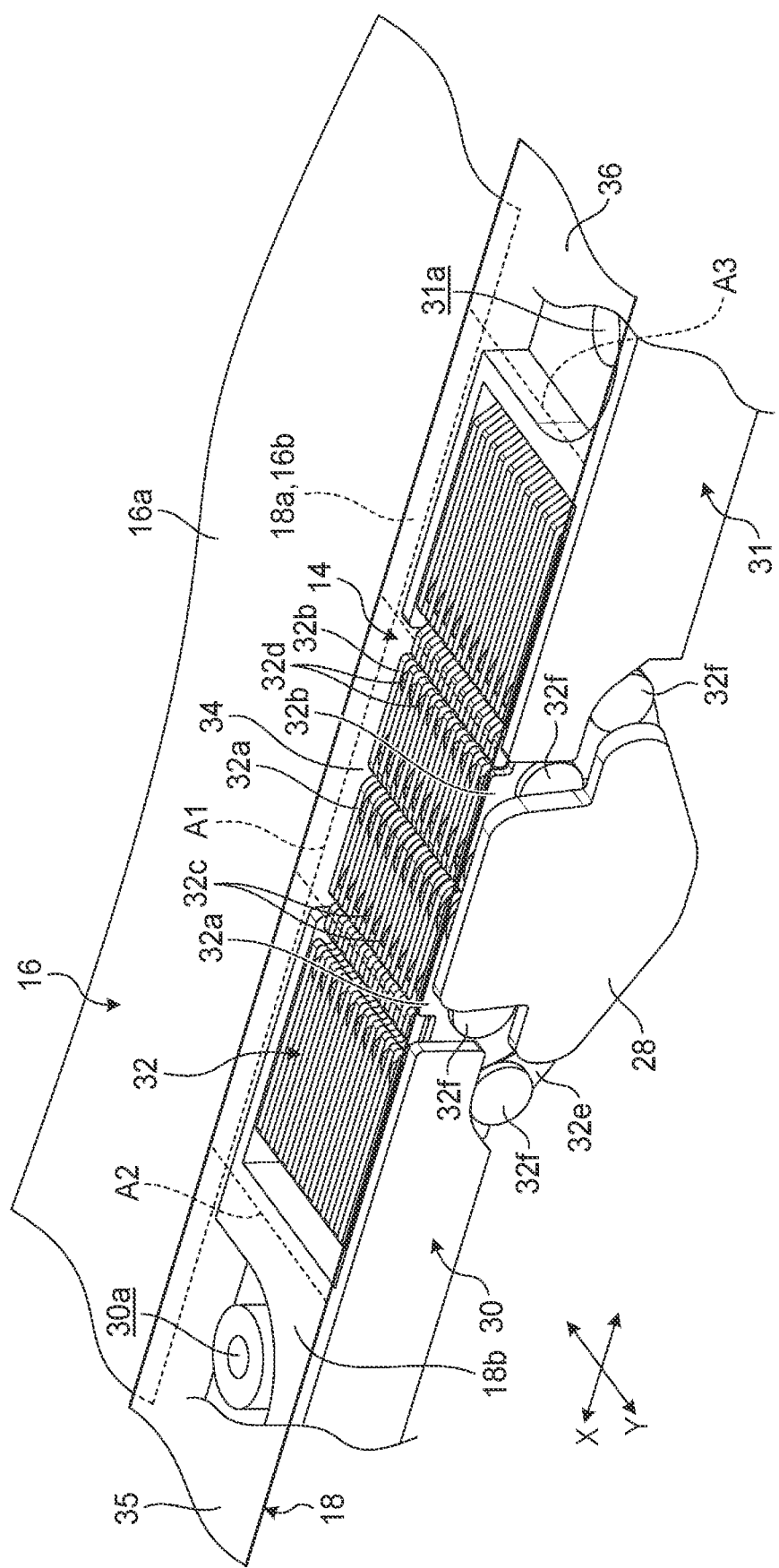
FIG. 4 is a perspective view enlarging a hinge and its peripheral portion.
Figure 5:
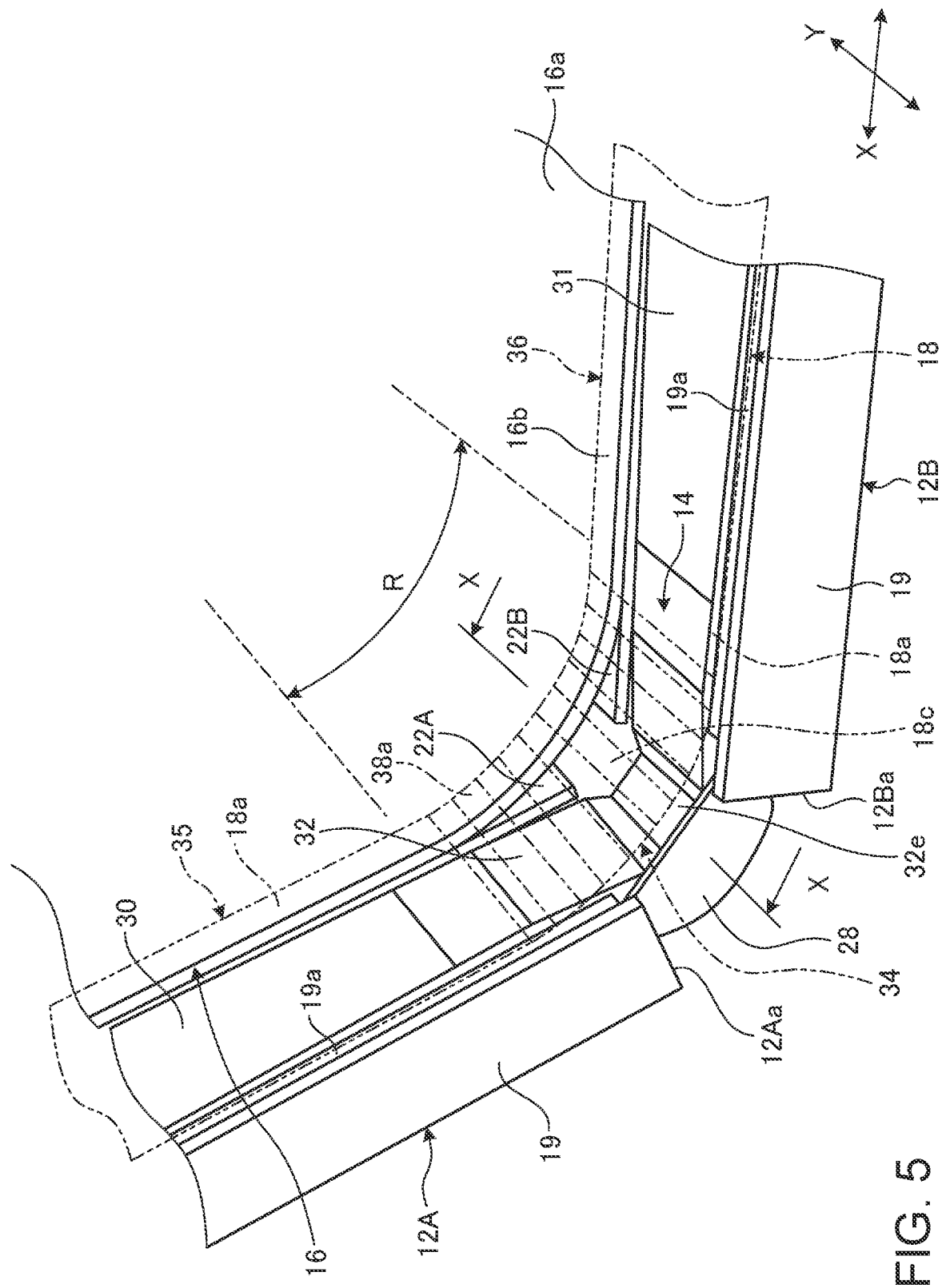
FIG. 5 is a schematic perspective view enlarging the hinge and its peripheral portion in a state in which chassis are rotated by a predetermined angle from a usage form toward the flat plate form.

FIG. 4 is a perspective view enlarging the hinge 14 and its peripheral portion. In FIG. 4, the bezel member 18 to be disposed on a top of the hinge 14 is made transparent, and illustration of the chassis 12A and 12B etc. is omitted. FIG. 5 is a schematic perspective view enlarging the hinge 14 and its peripheral portion in a state in which the chassis 12A and 12B are rotated by a predetermined angle (for example, about 50 degrees) from the usage form toward the flat plate form.

As illustrated in FIG. 2 to FIG. 5, the hinges 14 are disposed at a position that is outside of the outer peripheral edge portion 16b of the display 16 and under the bezel member 18. The hinge 14 rotates the chassis 12A and 12B so that the front face 16a of the display 16 can be always moved along a preset opening/closing track. An outer side portion of each hinge 14 is covered by a cover member 28. The hinge 14 has a first bracket 30, a second bracket 31, a rotation plate part 32, and a hinge shaft 33.

The first bracket 30 is a bracket for attaching the hinge 14 to the first chassis 12A and is made of block-shaped metal. The first bracket 30 is, for example, screwed to the inner face 12Ab of the first chassis 12A through a plurality of fastening holes 30a formed at various locations. The second bracket 31 is a bracket for attaching the hinge 14 to the second chassis 12B and is made of block-shaped metal or resin. The second bracket 31 is, for example, screwed to the inner face 12Bb through a plurality of fastening holes 31a formed at various locations. Some fastening holes 30a and 31a are also used for screwing the attachment piece 23 of the plates 22A and 22B (refer to FIG. 3).

The rotation plate part 32 has a first base plate group 32a, a second base plate group 32b, a first link plate group 32c, a second link plate group 32d, and a connecting plate group 32e. Each of the plate groups 32a to 32e has a structure in which metallic plates each having a predetermined shape are laminated in the Y direction. The first base plate group 32a is rotatably connected to the first chassis 12A. The second base plate group 32b is rotatably connected to the second chassis 12B. The connecting plate group 32e is disposed straddling the adjacent end portions 12Aa and 12Ba. The first link plate group 32c relatively rotatably connects the first base plate group 32a and the connecting plate group 32e. The second link plate group 32d relatively rotatably connects the second base plate group 32b and the connecting plate group 32e. A reference symbol 32f in FIG. 4 designates a hinge shaft that connects each of the plate groups 32a to 32e. As illustrated in FIG. 5, each of the plate groups 32a to 32e of the rotation plate part 32 is simplified in a box shape.

In the hinge 14, with respect to the central connecting plate group 32e, the first base plate group 32a and the first link plate group 32c on the first chassis 12A side are relatively rotated, and synchronously with this rotation, the second base plate group 32b and the second link plate group 32d on the second chassis 12B side are relatively rotated. At this time, the connecting plate group 32e moves in a direction contacting to and separating from the bending region R of the display 16. Thus, the hinge 14 can relatively rotate the chassis 12A and 12B. A configuration of the hinge 14 is not limited and can be changed as necessary.

The cover member 28 covers a gap between the adjacent end portions 12Aa and 12Ba of the chassis 12A and 12B separating from each other in an angle posture other than the flat plate form, and restrains foreign mattes from entering from this gap. In addition, the cover member 28 restrains internal components such as the hinge 14 or plates 22A and 22B from being exposed from the gap between the adjacent end portions 12Aa and 12Ba in appearance. The cover member 28 may be omitted.

Figure 6:
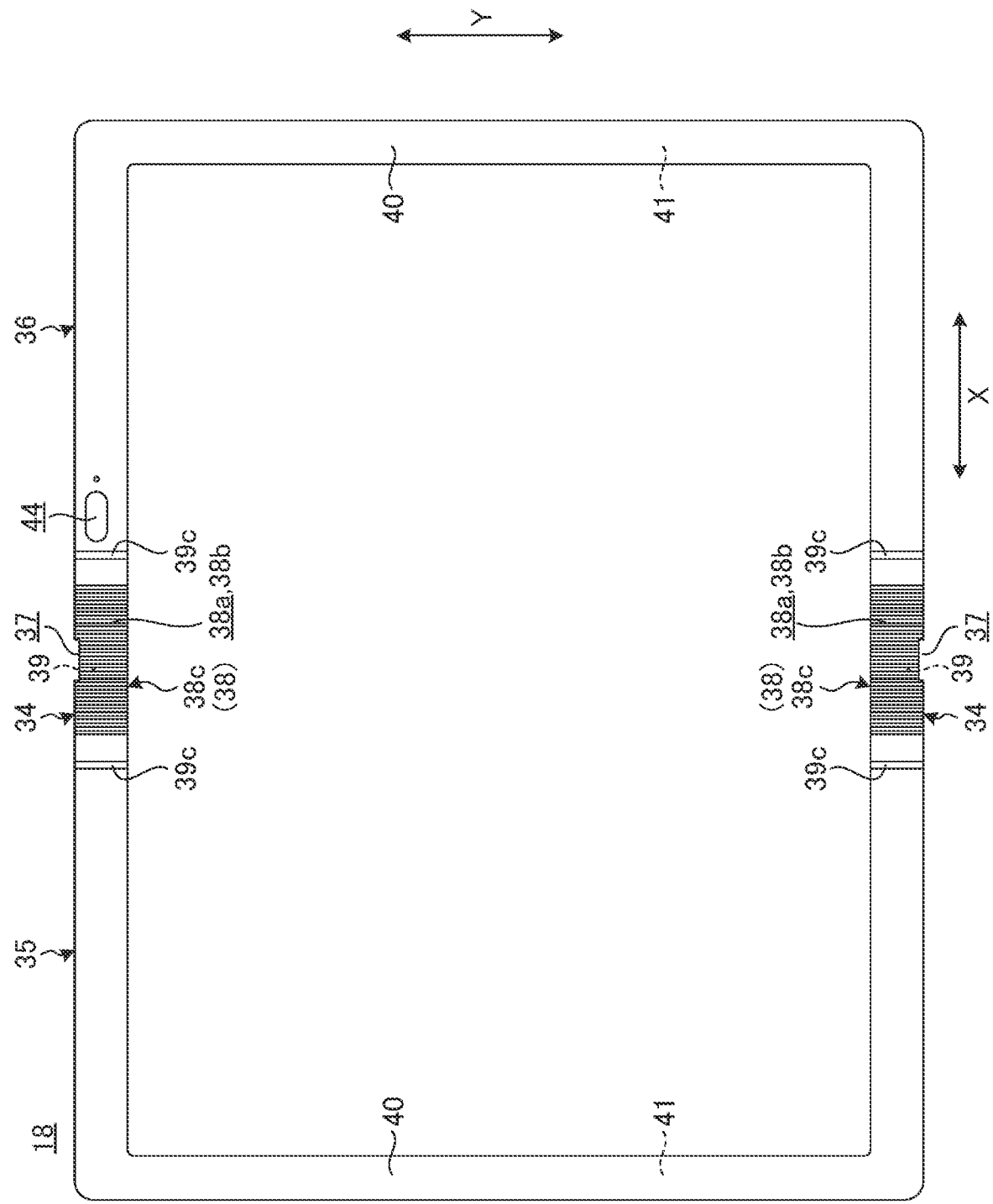
FIG. 6 is a schematic bottom view of a bezel member.

Next, a specific configuration of the bezel member 18 is described. FIG. 6 is a schematic bottom view of the bezel member 18.

As illustrated in FIG. 2 and FIG. 6, the bezel member 18 has a pair of bending parts 34 and 34, and a first frame part 35 and a second frame part 36 that are connected to right and left sides of the bending parts 34. The bezel member 18 is configured in the shape of a rectangular frame, and covers up a gap between the display 16 and the chassis frame part 19. The bezel member 18 straddles over the front face 16a of the outer peripheral edge portion 16b of the display 16 and a top end portion of the chassis frame part 19 adjacent thereto of the chassis 12A and 12B. The bezel member 18 according to one or more embodiments is formed of a sheet member that is generally thin and flexible and is different in structure and thickness between the bending part 34 and the frame parts 35 and 36.

The bezel member 18 has a first side portion 18a that is an inner region in the width direction, the first side portion 18a being fixed to the front face 16a of the outer peripheral edge portion 16b of the display 16 with a double-sided tape. The bezel member 18 has a second side portion 18b that is an outer region in the width direction, the second side portion 18b being fixed to a top face of a stepped part 19a (refer to FIG. 3 and FIG. 5) in which an inner portion of a top end face of the chassis frame part 19 is lowered by one step, with a double-sided tape. The bezel member 18 has a central portion 18c that is a region between the side portions 18a and 18b. When there is any member (for example, brackets 30 and 31 of the hinge 14) under the central portion 18c, the central portion 18c is fixed to this member with a double-sided tape. In this regard, the width direction of the bezel member 18 means a direction of straddling over the outer peripheral edge portion 16b and the chassis frame part 19 that are adjacent to each other, i.e., a direction that is orthogonal to a circumferential direction of the bezel member.

Figure 7:
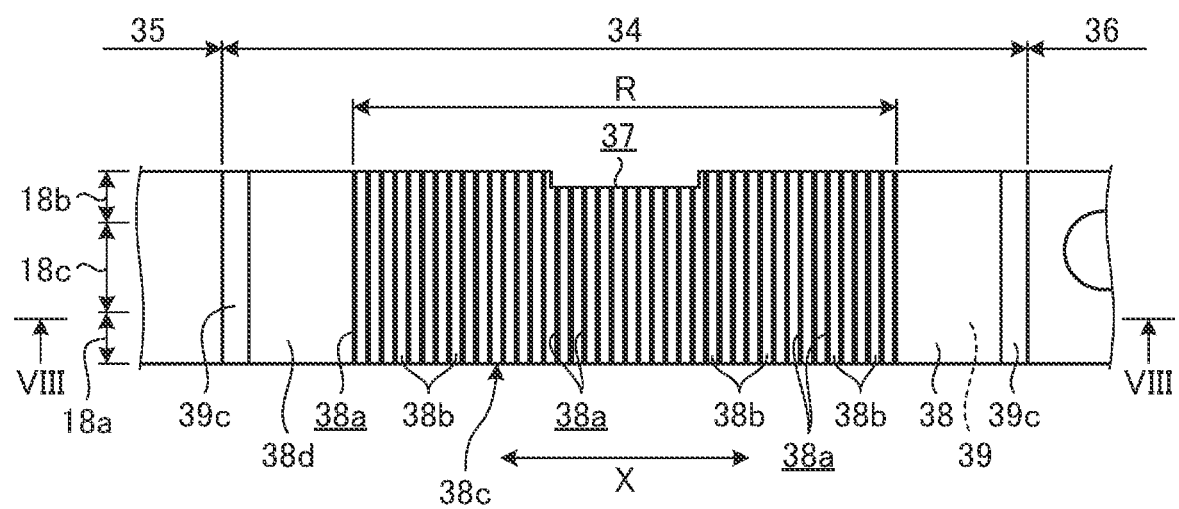
FIG. 7 is a bottom view enlarging a bending part and its peripheral portion.
Figure 8A:
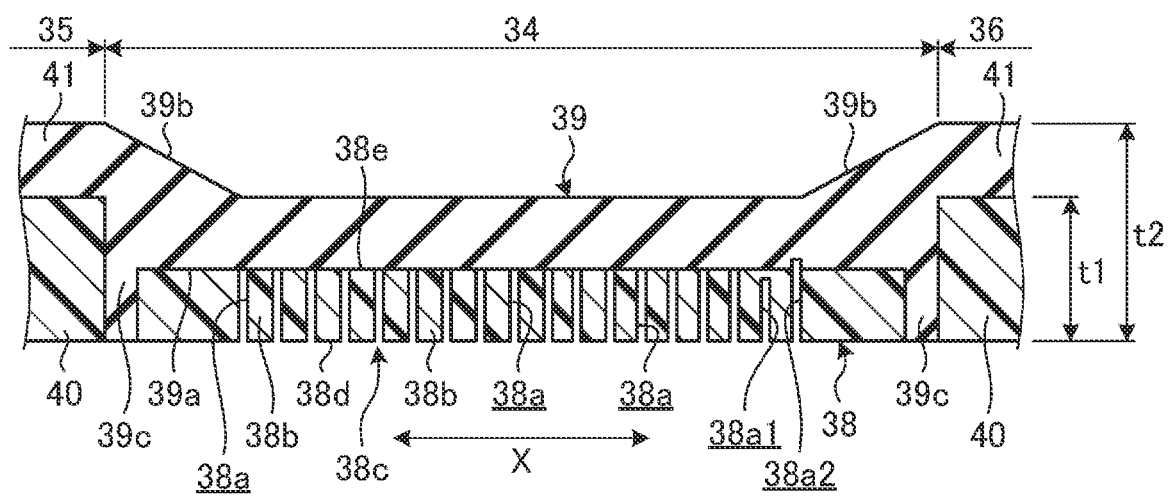
FIG. 8A is a schematic cross-sectional view along a VIII-VIII line in FIG. 7.
Figure 8B:
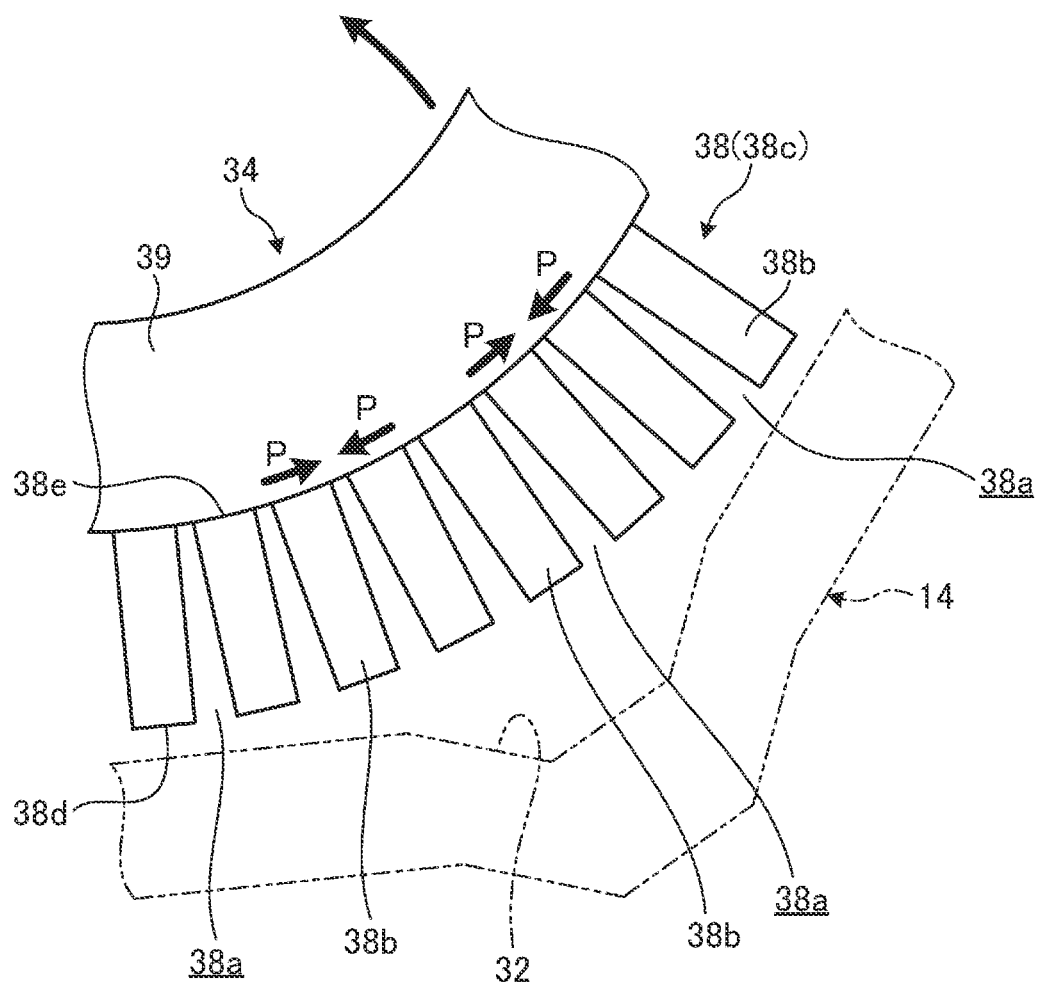
FIG. 8B is a partially enlarged cross-sectional view in a state in which the bending part as illustrated in FIG. 8A is bent by a predetermined angle.
Figure 9:
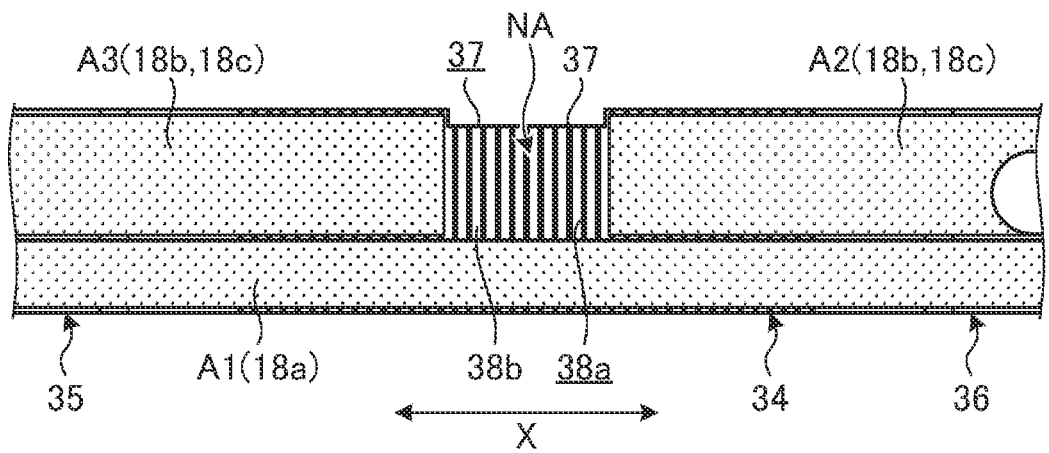
FIG. 9 is a bottom view in a state in which double-sided tapes are provided at the bending part and its peripheral portion.
Figure 10:
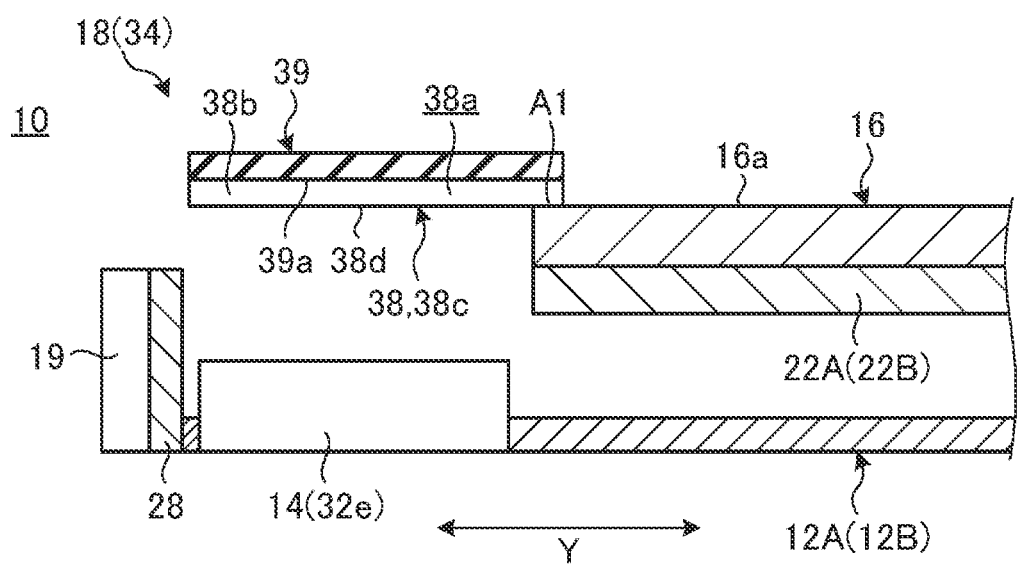
FIG. 10 is a schematic cross-sectional view along an X-X line in FIG. 5.

FIG. 7 is a bottom view enlarging the bending part 34 and its peripheral portion. FIG. 8A is a schematic cross-sectional view along a VIII-VIII line in FIG. 7. FIG. 8B is a partially enlarged cross-sectional view in a state where the bending part 34 as illustrated in FIG. 8A is bent by a predetermined angle. FIG. 9 is a bottom view in a state in which double-sided tapes A1 to A3 are provided at the bending part 34 and its peripheral portion. FIG. 10 is a schematic cross-sectional view along an X-X line in FIG. 5.

As illustrated in FIG. 2 and FIG. 6, the bending part 34 is a part that is provided at a position overlapping the bending region R of the display 16 and bends together with the bending region R in accordance with a rotating operation between the chassis 12A and 12B (refer to FIG. 5 and FIG. 8B). A pair of the bending parts 34 is provided in the Y direction and each bending part 34 is located over the hinge 14. The bending part 34 is formed in a length dimension in the X direction a little greater than a length dimension of the bending region R. The X-directional dimension of the bending part 34 may be the same as that of the bending region R. The second side portion 18b of the bending part 34 is provided with a notch-shaped recessed part 37 for escaping from the cover member 28. In the case of a configuration in which the cover member 28 is not provided, the recessed part 37 is omitted.

As illustrated in FIG. 7 to FIG. 8B, the bending part 34 has a laminated structure in which a first member 38 and a second member 39 are laminated.

The first member 38 is a lower layer of the bending part 34 and forms a mounting surface to the display 16 and the chassis frame part 19. The first member 38 is a thin sheet member that is made of a resin material such as PET (polyethylene terephthalate) or PC (polycarbonate). The first member 38 has a plurality of slits 38a that is provided side by side in the X direction, the slit 38a penetrating in the width direction. The slits 38a are provided at least at a portion that overlaps the bending region R along the full length of the first member 38 in the X direction. Thus, the first member 38 has a plurality of strip members 38b arranged in the X direction at least at the portion overlapping the bending region R, the strip member 38b extending in the width direction. Since the strip members 38b are each arranged in a comb teeth form at an interval of the X-directional width of the slit 38a between each other, they constitute a wave-shaped part 38c as a whole.

As illustrated in FIG. 8A, the slit 38a has a configuration in which the first member 38 is cut away in the width direction and thickness direction. Some or all slits 38a may be formed as a recessed part with a part of the first member 38 left in the thickness direction (refer to a slit 38a1 in FIG. 8A). In addition, some or all slits 38a may have a configuration in which their thickness is greater than that of the first member 38 and even a part of the second member 39 is cut away (refer to a slit 38a2 in FIG. 8A). The X-directional width of the slit 38a is, for example, 0.2 mm. The X-directional width of the strip member 38b is, for example, 1 mm. The X-directional widths of each slit 38a and each strip member 38b may be uniform or different.

As illustrated in FIG. 9, a back face 38d of the first member 38 has the first side portion 18a fixed to the front face 16a of the outer peripheral edge portion 16b of the display 16 with a double-sided tape A1. The back face 38d has a part of the second side portion 18b and the central portion 18c fixed to the stepped part 19a of the chassis 12A and 12B and a top face of the hinge 14 (top faces of the brackets 30 and 31 and rotation plate part 32) with double-sided tapes A2 and A3. The back face 38d has a rectangular portion, not provided with the double-sided tapes A1 to A3, of the second side portion 18b and central portion 18c straddling the bending region R, as a non-adhesive region NA. The non-adhesive region NA is not fixed to the top portion of the hinge 14 and the stepped part 19a of the chassis frame part 19 and is disposed in a state of being relatively movable to them.

The second member 39 is an upper layer of the bending part 34 and forms a surface (appearance surface) of the bezel member 18. The second member 39 has a back face 39a that is fixed to a front face 38e of the first member 38 by thermal welding or with an adhesive. The second member 39 is a thin sheet member that is made of a rubber material such as silicon rubber. The second member 39 may be made of resin instead of rubber, if the material is flexible and stretchable. Because the strip member 38b of the first member 38 is fixed to the back face 39a of the second member 39, each strip member 38b is neither displaced nor dropped off from the back face 39a.

The second member 39 according to one or more embodiments has tapered portions 39b that are formed near boundaries with the frame parts 35 and 36, a thickness of the tapered portion 39b gradually becoming smaller toward the center in the X direction. As mentioned later, because the bending part 34 according to one or more embodiments is thinner than the frame parts 35 and 36, a step on a surface of the bezel member 18 is absorbed by the tapered portions 39b. When the bending part 34 and the frame parts 35 and 36 are of the same thickness, the tapered portion 39b is omitted.

The second member 39 according to one or more embodiments has wall parts 39c that extend in a thickness direction of the bending part 34, at boundaries with the adjacent frame parts 35 and 36. That is, the bending part 34 is structured so that the front face 38e and both side faces in the X direction of the first member 38 are surrounded by the back face 39a and wall parts 39c of the second member 39. The wall part 39c is a part that is formed due to a manufacturing method of the bezel member 18 as mentioned later, and thus may be omitted in a different manufacturing method.

As illustrated in FIG. 2 and FIG. 6, the first frame part 35 is a substantially U-shaped part that extends along the chassis frame part 19 at three sides except for the adjacent end portion 12Aa of the first chassis 12A. The second frame part 36 is a substantially U-shaped part that extends along the chassis frame part 19 at three sides except for the adjacent end portion 12Ba of the second chassis 12B. Since the first frame part 35 and the second frame part 36 are of the same structure except for having a symmetrical shape to each other, the frame parts 35 and 36 are described together below.

As illustrated in FIG. 6 and FIG. 8A, the frame parts 35 and 36 each have a laminated structure in which a third member 40 and a fourth member 41 are laminated.

The third member 40 is a lower layer of the frame parts 35 and 36. The third member 40 is a thin sheet member that is made of a resin material such as PET (polyethylene terephthalate) or PC (polycarbonate). The third member 40 according to one or more embodiments is made of the same material as that of the first member 38 of the bending part 34. The third member 40 may be made of a material that is different from that of the first member 38. A back face of the third member 40 has the first side portion 18a fixed to the front face 16a of the outer peripheral edge portion 16b of the display 16 with the double-sided tape A1. The back face of the third member 40 has the second side portion 18b and the central portion 18c fixed to the stepped part 19a of the chassis 12A and 12B and the top face of the hinge 14 etc. with the double-sided tapes A2 and A3. The second side portion 18b and central portion 18c of the third member 40 may be relatively fixed with respect to the chassis 12A and 12B.

The fourth member 41 is an upper layer of the frame parts 35 and 36 and forms the surface of the bezel member 18 together with the second member 39. The fourth member 41 has a back face that is fixed to a front face of the third member 40 by thermal welding or with an adhesive. The fourth member 41 is a thin sheet member that is made of a rubber material such as silicon rubber. The fourth member 41 is integrated with the second member 39 of the bending part 34 (refer to FIG. 8A). The fourth member 41 according to one or more embodiments is made of the same material as that of the second member 39 of the bending part 34. The fourth member 41 may be made of a material that is different from that of the second member 39. The fourth member 41 may be made of resin instead of rubber.

As illustrated in FIG. 8A, the bezel member 18 is different in thickness between the bending part 34 and the frame parts 35 and 36. Specifically, a thickness of the first member 38 is, for example, 0.19 mm, and that of the second member 39 is, for example, 0.21 mm. A thickness t1 of the bending part 34 is therefore, for example, 0.4 mm. On the other hand, a thickness of the third member 40 is, for example, 0.4 mm, and that of the fourth member 41 is, for example, 0.2 mm. A thickness t2 of the frame parts 35 and 36 is therefore, for example, 0.6 mm.

A reference symbol 44 in FIG. 6 designates an opening that penetrates through the bezel member 18 in its thickness direction. The opening 44 is a hole for exposing a camera etc. (not illustrated) that is mounted on the portable information device 10, to the outer appearance.

Next, illustrated is one example of a manufacturing method of the bezel member 18. FIG. 11A to FIG. 11D are schematic views illustrating states during manufacture of the bezel member 18.

Figure 11A:
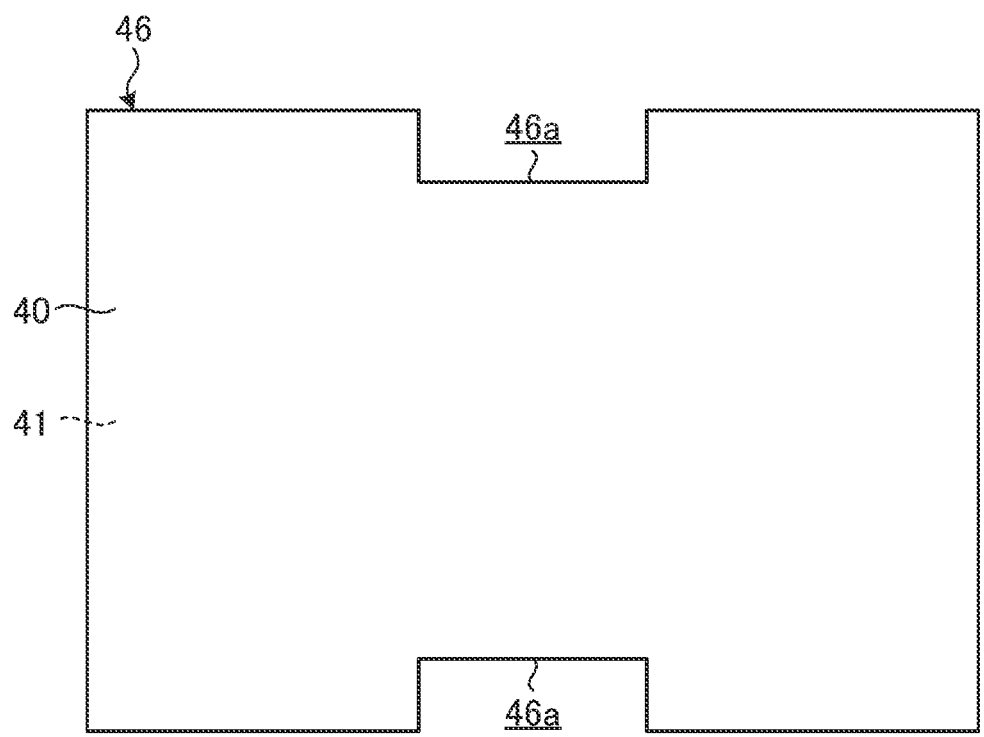
FIG. 11A is a schematic bottom view of a frame part material sheet.

When the bezel member 18 is manufactured, a frame part material sheet 46 is first formed as illustrated in FIG. 11A. The frame part material sheet 46 has the same laminated structure as the frame parts 35 and 36 described above. That is, the frame part material sheet 46 is a sheet in which the third member 40 and the fourth member 41 are laminated, and has an outer shape that is larger than that of the bezel member 18. The frame part material sheet 46 has a structure in which, for example, a PET sheet (third member 40) of 0.4 mm thickness and a silicon rubber sheet (fourth member 41) of 0.2 mm thickness are laminated. It is to be noted that, in the frame part material sheet 46, a cutout part 46a is formed in a part where the bending part 34 is provided.

Figure 11B:
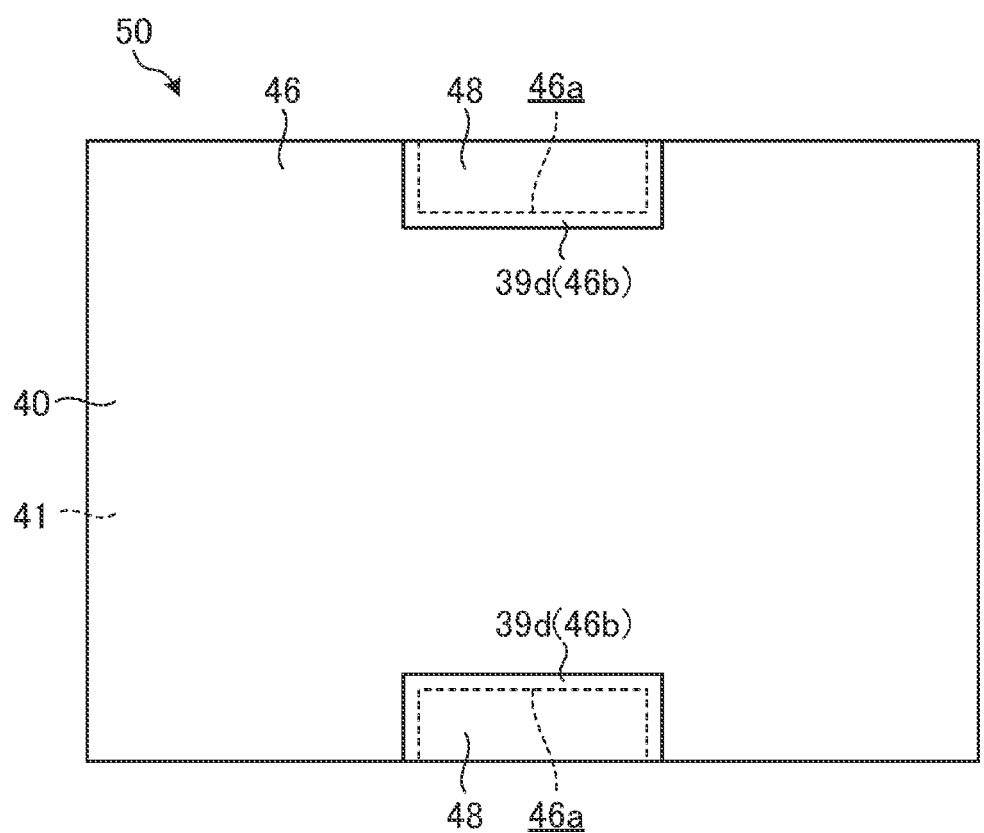
FIG. 11B is a schematic bottom view in a state in which a bending part material sheet is attached to the frame part material sheet.
Figure 11C:
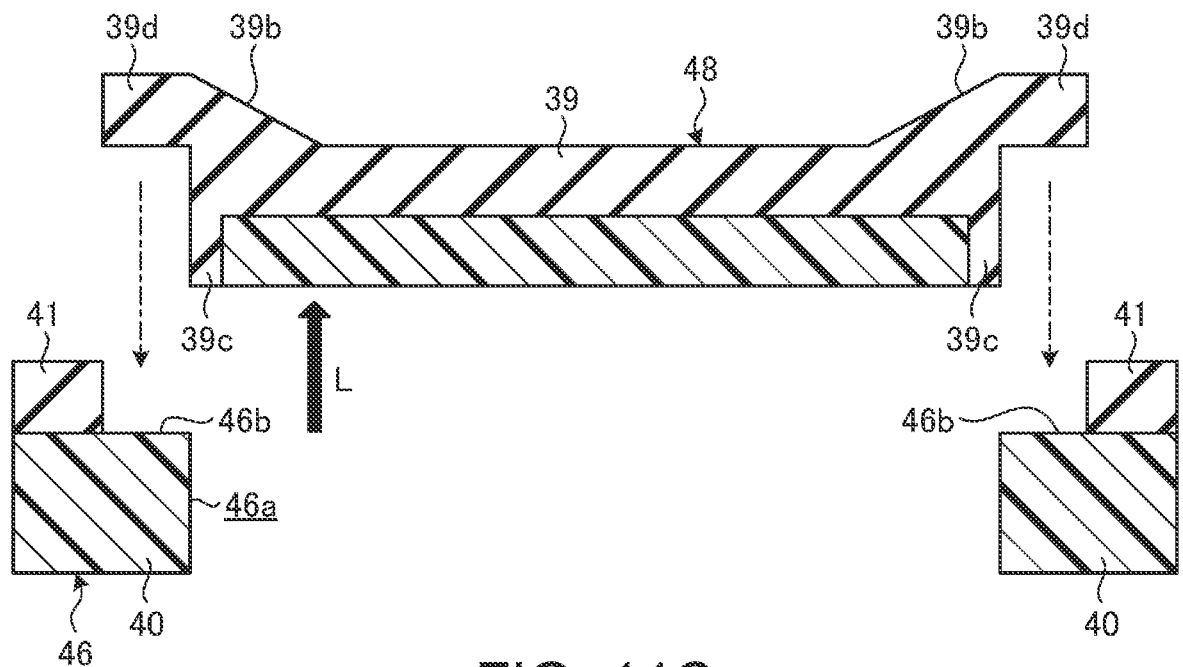
FIG. 11C is a schematic cross-sectional view illustrating an operation of attaching the bending part material sheet to the frame part material sheet.

Next, a bending part material sheet 48 is attached to the cutout part 46a of the frame part material sheet 46, as illustrated in FIG. 11B. The bending part material sheet 48 has the same laminated structure as the bending part 34 described above. That is, the bending part material sheet 48 is a sheet in which the first member 38 and the second member 39 are laminated, as illustrated in FIG. 11C. It is to be noted that the bending part material sheet 48 is in a state before the slits 38a (strip members 38b) are formed in the bending part 34 as illustrated in FIG. 8A. The bending part material sheet 48 has a structure in which, for example, a PET sheet (first member 38) of 0.19 mm thickness and a silicon rubber sheet (second member 39) of 0.21 mm thickness are laminated.

As illustrated in FIG. 11C, the first member 38 and wall part 39c of the bending part material sheet 48 are inserted into the cutout part 46a of the frame part material sheet 46. At this time, a flange part 39d provided on an outer side of the second member 39 of the bending part material sheet 48 is disposed on a stepped part 46b obtained by offsetting the fourth member 41 of the frame part material sheet 46. Then, the bending part material sheet 48 and the frame part material sheet 46 are compressed in the thickness direction while heated. Thus, the second member 39 of the bending part material sheet 48 is thermally welded to the third member 40 and fourth member 41 of the frame part material sheet 46. As a result, formed is a bezel material sheet 50 into which the bending part material sheet 48 and the frame part material sheet 46 are integrated (refer to FIG. 11D).

Figure 11D:
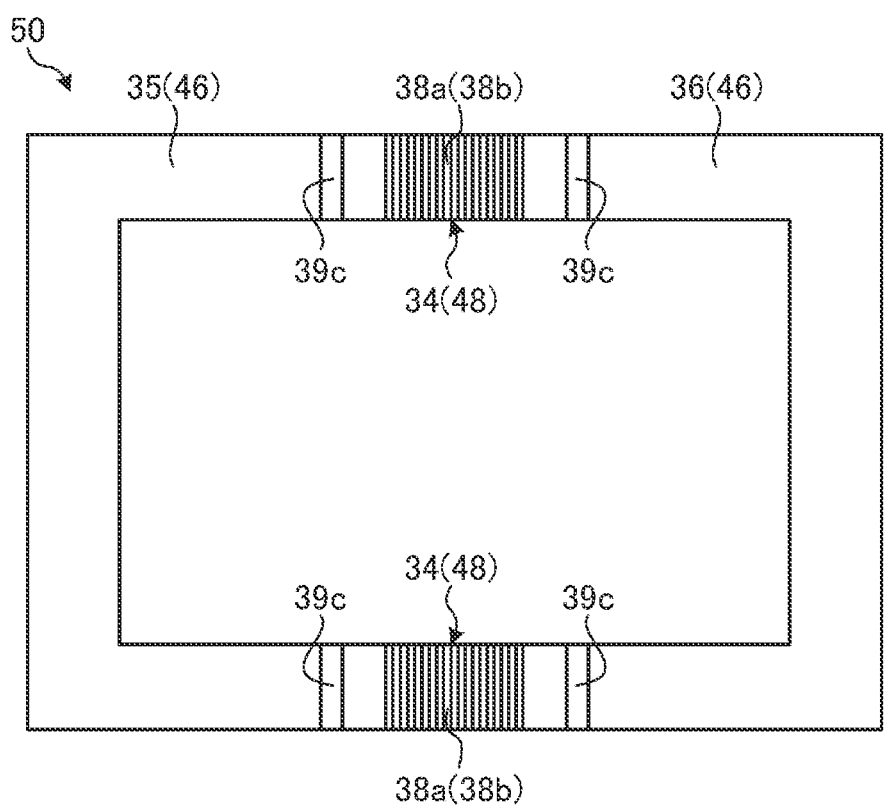
FIG. 11D is a schematic bottom view in a state in which the bezel member is cut out from a bezel material sheet.

Then, the bezel material sheet 50 is cut out in the same frame shape as the bezel member 18, as illustrated in FIG. 11D. In addition, after or before this cutting-out process, laser L of a predetermined laser processing machine is irradiated on the first member 38 of the bending part material sheet 48 (refer to FIG. 11C) to form the slits 38a (strip members 38b) in the first member 38. The slits 38a may be formed by a cutting machine etc. instead of the laser processing machine.

Now the manufacture of the bezel member 18 is completed. When the frame part material sheet 46 and the bending part material sheet 48 are joined by thermal welding in this manner, a boundary line between the sheets 46 and 48 is not conspicuous on the surface of the bezel member 18 and thus the good quality of appearance is obtained. It is to be noted that the frame part material sheet 46 and the bending part material sheet 48 may be joined by, for example, an adhesive etc.

The bending part material sheet 48 may not have a configuration in which the tapered portion 39b is provided in advance as illustrated in FIG. 11C. In this case, a flat plate in which the first member 38 and the second member 39 are laminated with only the flange part 39d may be provided, and the tapered portion 39b may be formed in crushing the flat plate in a thermal welding process. The tapered portion 39b may not be necessary when the bending part 34 and the frame parts 35 and 36 are formed in the same thickness. In addition, the bending part material sheet 48 in which the slits 38a (strip members 38b) are formed in advance may be joined to the frame part material sheet 46.

As described above, the portable information device 10 according to one or more embodiments includes a bezel member that is provided straddling over the outer peripheral edge portion 16b of the display 16 and the chassis frame part 19 of the chassis 12A and 12B and has the bending part 34 at a portion overlapping the bending region R. This bending part 34 has the first member 38 in which the first side portion is fixed to the front face 16a of the outer peripheral edge portion 16b and the second side portion is disposed to be relatively movable with respect to the chassis frame part 19, in the width direction, and the second member 39 that is laminated on and fixed to the front face 38e of the first member 38 and is made of a material more flexible than that of the first member 38. Then, since a plurality of the slits 38a penetrating in the width direction is provided side by side in the X direction, this first member 38 has the wave-shaped part 38*c* in which a plurality of the strip members 38*b* extending in the width direction is arranged in the X direction.

Therefore, when the portable information device 10 is used, for example, in an angle posture (for example, about 130 degrees. Refer to FIG. 5 and FIG. 10) in which the chassis 12A and 12B are slightly folded from the flat plate form, the bending part 34 of the bezel member 18 bent together with the bending region R of the display 16, becomes a cantilevered state in which only the first side portion 18*a* is supported by the outer peripheral edge portion 16*b* of the display 16 (refer to FIG. 5 and FIG. 10). Thus, if the bending part 34 is formed of only the flexible second member 39 that is made of silicon rubber etc., the bending part 34 generates a dimple-like recess to reduce the quality of appearance of the portable information device 10. In this regard, the bending part 34 of the bezel member 18 has the first member 38 harder than the second member 39 having the wave-shaped part 38*c* in which a plurality of the strip members 38*b* extending in the width direction is arranged. Thus, the hard strip member 38*b* functions as a beam member that supports the flexible second member 39 projecting toward an outer peripheral side from the outer peripheral edge portion 16*b* of the display 16.

As a result, the generation of the dimple-like recesses by the bending part 34 of the bezel member 18 is prevented and thus the reduction in the quality of appearance can be prevented. In this bending part 34, because the X directional width of the strip member 38*b* is greater than that of the slit 38*a*, the strip member 38*b* can assure high rigidity as a beam member.

By the way, since the bezel member 18 is provided on the front face 16*a* of the display 16, it is disposed on the more distant (higher) side than the rotational center of the hinge 14 from the inner faces 12Ab and 12Bb of the chassis 12A and 12B. That is, the bezel member 18 is located inside the shaft center of the hinge 14 when the chassis 12A and 12B are changed from the flat plate form to the folded form. Thus, when the chassis 12A and 12B are closed, the bending part 34 of the bezel member 18 receives a compressing force P (refer to FIG. 8B) due to a phenomenon of turning radius difference. As a result, there are concerns that the bending part 34 of the bezel member 18 may generate a wrinkle or slack. In this regard, the bezel member 18 has the first member 38 functioning as a beam member having a structure formed by arranging the strip members 38*b*, and the flexible second member 39 is provided on the first member 38, as described above. Thus, when the bending part 34 is bent, the second member 39 is crushed and contracted by the compressing force P at portions corresponding to the slits 38*a* between the adjacent strip members 38*b* and 38*b*, as illustrated in FIG. 8B. As a result, generation of not only the recess as described above but also a wrinkle or floating etc. by the bending part 34 of the bezel member can be prevented. That is, since the bending part 34 has structural strength and weakness in the laminating direction, the second member 39 that is weak is selectively compressed more than the first member 38 that is strong, and thus rising during rotation is suppressed. In addition, when the compressing force P is applied to the bending part 34 and the compressing force P escapes as a force in a peeling-off direction of an adhesive part (for example, double-sided tape) of the bending part 34 and the display 16 or chassis frame part 19, the second member 39 is crushed at the portions corresponding to the slits 38*a* between the strip members 38*b* and 38*b*, and thus the peeling off of the adhesive part can also be prevented.

In the bezel member 18, the thickness of the frame parts 35 and 36 that do not perform any bending operation, is greater than that of the bending part 34 that performs bending operation. That is, since the bending part 34 is formed of a thinner sheet, a smooth bending operation can be made and the occurrence of a wrinkle or floating can be further prevented. On the other hand, since the frame portions 35 and 36 are ones that do not perform any bending operation, they have no impact on the bending operation even with some thickness. Then, since these frame parts 35 and 36 have a sufficient thickness, it can be prevented that an outline of a head of a screw for fastening the hinge 14 and the plates 22A and 22B to the chassis 12A and 12B stands out on a surface of the frame parts 35 and 36. Furthermore, since the frame parts 35 and 36 have a sufficient thickness, occurrence of warpage or deflection generated when the frame part material sheet 46 is formed as illustrated in FIG. 11A is prevented as much as possible. Thus, the frame parts 35 and 36 also have an advantage that when they are fixed to the display 16 and the chassis frame part 19 with the double-sided tapes A1 to A3, their flatness is high and the double-sided tapes A1 to A3 are hardly released. Such a configuration in which the thickness of the frame parts 35 and 36 is greater than that of the bending part 34 can also be effectively used for a bezel member having a configuration in which the bending part 34 does not have the slits 38*a* (strip members 38*b*). It is to be noted that at least a minimum thickness portion of the bending part 34 may be thinner than the frame parts 35 and 36, and in the configuration including the tapered portion 39*b* as illustrated in FIG. 8A, a thickness of a portion other than the tapered portion 39*b* may be thinner than that of the frame parts 35 and 36.

Meanwhile, it is a matter of course that the present invention is not limited to one or more embodiments described above and can be freely altered without deviating from the spirit of the present invention.

In the above, illustrated as an example is the configuration in which the wave-shaped part 38*c* formed of the strip members 38*b* is provided only in the bending part 34. However, the wave-shaped part 38*c* may be provided over the entire circumference of the bezel member 18.

Although the portable information device 10 foldable into a double-folded state like a book is illustrated as an example in the above, one or more embodiments can be applied to various configurations, such as a hinged double door configuration of foldably connecting respective small chassis to right and left edge portions of a large chassis, an S-type folding configuration of connecting respective chassis with different folding directions to right and left edge portions of one chassis, a J-type folding configuration of foldably connecting a small chassis to either right or left edge portion of a large chassis and the like, other than the configuration of folding chassis of the same shape into a double-folded state, and the number of connected chassis may be four or more. In addition, when the number of connected chassis is three or more, a display may be foldably provided between at least two chassis, a bezel member may be provided to cover an outer peripheral edge portion of this display, and another chassis may be mounted with another display.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

10 portable information device
12A first chassis
12B second chassis
14 hinge
16 display
18 bezel member
18a first side portion
18b second side portion
18c central portion
19 chassis frame part
34 bending part
35 first frame part
36 second frame part
38 first member
38a, 38a1, 38a2 slit
38b strip member
39 second member
39c wall part
40 third member
41 fourth member

What is claimed is:

1. A portable information device, comprising:
   a first chassis;
   a second chassis adjacent to the first chassis;
   a hinge that relatively rotatably connects adjacent end portions of the first chassis and the second chassis;
   a display extending over the first chassis and the second chassis and having a bending region at a position straddling the adjacent end portions of the first chassis and the second chassis; and
   a bezel member:
      that is disposed straddling over an outer peripheral edge portion of the display and a chassis frame part of the first chassis and the second chassis, wherein the chassis frame part is adjacent to the outer peripheral edge portion of the display, and
      that has a bending part at a portion overlapping the bending region, wherein
   the bending part of the bezel member comprises:
      a first member having a first side portion and a second side portion in a width direction straddling over the outer peripheral edge portion of the display and the chassis frame part of the first chassis and the second chassis, wherein the first side portion is fixed to a front face of the outer peripheral edge portion, and wherein the second side portion is disposed relatively movable with respect to the chassis frame part; and
      a second member laminated on and fixed to a front face of the first member and made of a material more flexible than that of the first member, and
   the first member has a configuration in which a plurality of strip members extending in the width direction is arranged in an arranging direction of the first chassis and the second chassis, by a plurality of slits penetrating in the width direction being provided side by side in the arranging direction.

2. The portable information device according to claim 1, wherein
   the bezel member that connects a first frame part to be disposed on the first chassis and a second frame part to be disposed on the second chassis by the bending part, the first frame part and the second frame part each comprises:
      a third member having a first side portion and a second side portion, the first side portion being fixed to the front face of the outer peripheral edge portion and the second side portion being relatively connected with respect to the chassis frame part, in the width direction; and
      a fourth member laminated on and fixed to a front face of the third member and made of a material more flexible than that of the third member.

3. The portable information device according to claim 2, wherein
   a thickness of the first frame part and the second frame part of the bezel member is greater than that of the bending part.

4. The portable information device according to claim 2, wherein
   in the bezel member,
      the second member and the fourth member are continuous, and
      the first member and the third member are divided by a wall part made of the same material as that of the second member.

5. The portable information device according to claim 1, wherein
   the hinge is disposed between the outer peripheral edge portion and the chassis frame part, and
   the first member has a central portion between the first side portion and the second side portion, the central portion being disposed on a top portion of the hinge in a state of being relatively movable.

6. The portable information device according to claim 1, wherein
   the strip member has a dimension in the arranging direction greater than that of the slit.

7. The portable information device according to claim 1, wherein
   the first member is made of resin, and
   the second member is made of rubber.

8. A portable information device, comprising:
   a first chassis;
   a second chassis adjacent to the first chassis;
   a hinge that relatively rotatably connects adjacent end portions of the first chassis and the second chassis;
   a display extending over the first chassis and the second chassis and provided with a bending region at a position straddling the adjacent end portions of the first chassis and the second chassis; and
   a bezel member:
      that is disposed straddling over an outer peripheral edge portion of the display and a chassis frame part of the first chassis and the second chassis, wherein the chassis frame part is adjacent to the outer peripheral portion of the display, and
      that has a bending part at a portion overlapping the bending region, wherein
   a thickness of the bending part of the bezel member is less than a thickness of a part of the bezel member that is other than the bending part,
   the bending part of the bezel member comprises:
      a first member having a first side portion and a second side portion, the first side portion being fixed to a front face of the outer peripheral edge portion and the second side portion being disposed to be relatively movable with respect to the chassis frame part, in a width direction straddling over the outer peripheral edge portion of the display and the chassis frame part of the first chassis and the second chassis; and a second member laminated on and fixed to a front face of the first member and made of a material more flexible than that of the first member, and the first member has a wave-shaped part in which a plurality of strip members extending in the width direction is arranged in an arranging direction of the first chassis and the second chassis, by a plurality of slits penetrating in the width direction being provided side by side in the arranging direction.

\* \* \* \* \*